(12) United States Patent
Gerovich et al.

(10) Patent No.: US 12,445,494 B2
(45) Date of Patent: Oct. 14, 2025

(54) METHOD AND SYSTEM FOR FACILITATING PERMISSION MANAGEMENT

(71) Applicant: JPMorgan Chase Bank, N.A., New York, NY (US)

(72) Inventors: Pavel Gerovich, Bayside, NY (US); Joel Baker, Northwood (GB); Oluwagbemiga Oni, New York, NY (US); Martin K Hellen, Surrey (GB); Thilak Maskibail, Buckinghamshire (GB); David Katz, Westfield, NJ (US); Maria De La Paz Vives, New York, NY (US); Christopher D Hannant, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 261 days.

(21) Appl. No.: 18/132,680

(22) Filed: Apr. 10, 2023

(65) Prior Publication Data
US 2024/0340316 A1   Oct. 10, 2024

(51) Int. Cl.
*H04L 41/28* (2022.01)
*H04L 9/40* (2022.01)

(52) U.S. Cl.
CPC .............. *H04L 63/20* (2013.01); *H04L 41/28* (2013.01); *H04L 63/101* (2013.01)

(58) Field of Classification Search
CPC ........ H04L 63/20; H04L 41/28; H04L 63/101
See application file for complete search history.

(56) References Cited

U.S. PATENT DOCUMENTS

| | | | |
|---|---|---|---|
| 10,594,730 B1 * | 3/2020 | Summers | H04L 63/0892 |
| 2015/0269383 A1 * | 9/2015 | Lang | G06F 21/57 726/1 |
| 2019/0007418 A1 * | 1/2019 | Cook | H04N 21/443 |
| 2022/0201043 A1 * | 6/2022 | Pugalia | H04L 63/105 |
| 2022/0286457 A1 * | 9/2022 | Cohen | H04L 63/102 |
| 2023/0022134 A1 * | 1/2023 | Talwar | G06F 9/45558 |

FOREIGN PATENT DOCUMENTS

WO   WO-2017138944 A1 *   8/2017   .............. G06N 5/04

* cited by examiner

*Primary Examiner* — Jung W Kim
*Assistant Examiner* — Howard H. Louie
(74) *Attorney, Agent, or Firm* — Greenblum & Bernstein, P.L.C.

(57) ABSTRACT

A method for facilitating a permission management pipeline to provide policy taxonomy governance is disclosed. The method includes receiving data sets that are shared from a producer application, the data sets including data, corresponding metadata, and producer policy logic; tagging the data and the corresponding metadata for each of the data sets to identify raw data and permission schema data; determining, by using a model, declarative rules by parsing the producer policy logic; generating, by using the model, standard policies based on the determined declarative rules, the standard policies corresponding to executable standard entitlement policies; executing the generated standard policies by using a policy enforcement function, the tagged data, and the tagged corresponding metadata; and generating, based on a result of the executing, producer permissions that are paired with the data sets, the producer permissions including an entity-group access-control list of permissions that is associated with the data sets.

20 Claims, 6 Drawing Sheets

METHOD AND SYSTEM FOR FACILITATING PERMISSION MANAGEMENT

BACKGROUND

1. Field of the Disclosure

This technology generally relates to methods and systems for managing data permissions, and more particularly to methods and systems for facilitating a permission management pipeline that transforms disparate permission policies from different computing platforms into a standardized and consistent policy taxonomy.

2. Background Information

Many business entities operate several different computing environments such as, for example, on-premises computing environments and cloud computing environments to provide services for users. Often, data residing on each of these different computing environments are associated with different permission models that are audited and approved for use only in the corresponding computing environment. Historically, implementations of conventional permission taxonomy management techniques have resulted in varying degrees of success with respect to compatibility and fidelity for usage across multiple computing environments.

One drawback of using the conventional permission taxonomy management techniques is that in many instances, when data sets from one computing environment needs to be on-boarded to another computing environment, the data sets from different computing environments are joined together. As a result, different permission taxonomies from each of the data sets, which are each designed for a different computing environment, are also joined together. Additionally, the different computing environments may have existing, distinct permission models that have been audited and approved for compliance by various compliance teams.

Therefore, there is a need to establish a permission taxonomy that is generic enough to be applied to data sets that are mixed across multiple different computing environments without sacrificing the fidelity of existing environment-specific approved permission models.

SUMMARY

The present disclosure, through one or more of its various aspects, embodiments, and/or specific features or sub-components, provides, inter alia, various systems, servers, devices, methods, media, programs, and platforms for facilitating a permission management pipeline that transforms disparate permission policies from different computing platforms into a standardized and consistent policy taxonomy.

According to an aspect of the present disclosure, a method for facilitating a permission management pipeline to provide policy taxonomy governance is disclosed. The method is implemented by at least one processor. The method may include receiving at least one data set that is shared from a producer application, the at least one data set may include data, corresponding metadata, and producer policy logic; tagging the data and the corresponding metadata for each of the at least one data set to identify raw data and permission schema data; determining, by using at least one model, at least one rule by parsing the producer policy logic, the at least one rule may include a declarative rule; generating, by using the at least one model, at least one standard policy based on the determined at least one rule, the at least one standard policy may correspond to an executable standard entitlement policy; executing the generated at least one standard policy by using a policy enforcement function, the tagged data, and the tagged corresponding metadata; and generating, based on a result of the executing, at least one producer permission that is paired with the at least one data set, the at least one producer permission may include an entity-group access-control list of permissions that is associated with the at least one data set.

In accordance with an exemplary embodiment, the method may further include deriving an access permission for each of a plurality of data products from the producer application based on the generated at least one producer permission, wherein, when a query for access to the plurality of data products is received from a data consumer, the access may be limited to a subset of the plurality of data products for which an entity-group of the data consumer has obtained a permission.

In accordance with an exemplary embodiment, the method may further include receiving, from the data consumer, an access query for the plurality of data products, the access query may include a security identifier that corresponds to the data consumer; verifying the access query by using the security identifier; and exposing the plurality of data products to the data consumer based on a result of the verifying.

In accordance with an exemplary embodiment, to verify the access query, the method may further include identifying at least one consumer access permission that is associated with the data consumer by using the security identifier; comparing the identified at least one consumer access permission with the access permission that corresponds to each of the plurality of data products; and verifying the access query based on a result of the comparing.

In accordance with an exemplary embodiment, to tag the data and the corresponding metadata, the method may further include matching the data and the corresponding metadata with a predetermined tag, the predetermined tag may correspond to a normalized label that identifies the data and the corresponding metadata, and provides context for the data and the corresponding metadata; and mapping the predetermined tag to the data and the corresponding metadata for each of the at least one data set.

In accordance with an exemplary embodiment, the predetermined tag may include at least one from among a normalized descriptive policy tag, a raw producer entity-group permission tag, a raw producer data tag, and a conformed producer data tag.

In accordance with an exemplary embodiment, prior to the matching, the method may further include parsing, by using the at least one model, the data and the corresponding metadata to identify at least one data schema; determining, by using the at least one model, a predicted tag based on the identified at least one data schema; and matching the data and the corresponding metadata with the predicted tag.

In accordance with an exemplary embodiment, to generate the at least one standard policy, the method may further include automatically generating, by using the at least one model, the at least one standard policy based on the determined at least one rule; and validating, by using the at least one model, the at least one standard policy based on a predetermined guideline.

In accordance with an exemplary embodiment, the generated at least one producer permission may relate to entity-group permissions for reading objects in the at least one data set.

According to an aspect of the present disclosure, a computing device configured to implement an execution of a method for facilitating a permission management pipeline to provide policy taxonomy governance is disclosed. The computing device including a processor; a memory; and a communication interface coupled to each of the processor and the memory, wherein the processor may be configured to receive at least one data set that is shared from a producer application, the at least one data set may include data, corresponding metadata, and producer policy logic; tag the data and the corresponding metadata for each of the at least one data set to identify raw data and permission schema data; determine, by using at least one model, at least one rule by parsing the producer policy logic, the at least one rule may include a declarative rule; generate, by using the at least one model, at least one standard policy based on the determined at least one rule, the at least one standard policy may correspond to an executable standard entitlement policy; execute the generated at least one standard policy by using a policy enforcement function, the tagged data, and the tagged corresponding metadata; and generate, based on a result of the executing, at least one producer permission that is paired with the at least one data set, the at least one producer permission may include an entity-group access-control list of permissions that is associated with the at least one data set.

In accordance with an exemplary embodiment, the processor may be further configured to derive an access permission for each of a plurality of data products from the producer application based on the generated at least one producer permission, wherein, when a query for access to the plurality of data products is received from a data consumer, the access may be limited to a subset of the plurality of data products for which an entity-group of the data consumer has obtained a permission.

In accordance with an exemplary embodiment, the processor may be further configured to receive, from the data consumer, an access query for the plurality of data products, the access query may include a security identifier that corresponds to the data consumer; verify the access query by using the security identifier; and expose the plurality of data products to the data consumer based on a result of the verifying.

In accordance with an exemplary embodiment, to verify the access query, the processor may be further configured to identify at least one consumer access permission that is associated with the data consumer by using the security identifier; compare the identified at least one consumer access permission with the access permission that corresponds to each of the plurality of data products; and verify the access query based on a result of the comparing.

In accordance with an exemplary embodiment, to tag the data and the corresponding metadata, the processor may be further configured to match the data and the corresponding metadata with a predetermined tag, the predetermined tag may correspond to a normalized label that identifies the data and the corresponding metadata, and provides context for the data and the corresponding metadata; and map the predetermined tag to the data and the corresponding metadata for each of the at least one data set.

In accordance with an exemplary embodiment, the predetermined tag may include at least one from among a normalized descriptive policy tag, a raw producer entity-group permission tag, a raw producer data tag, and a conformed producer data tag.

In accordance with an exemplary embodiment, prior to the matching, the processor may be further configured to parse, by using the at least one model, the data and the corresponding metadata to identify at least one data schema; determine, by using the at least one model, a predicted tag based on the identified at least one data schema; and match the data and the corresponding metadata with the predicted tag.

In accordance with an exemplary embodiment, to generate the at least one standard policy, the processor may be further configured to automatically generate, by using the at least one model, the at least one standard policy based on the determined at least one rule; and validate, by using the at least one model, the at least one standard policy based on a predetermined guideline.

In accordance with an exemplary embodiment, the generated at least one producer permission may relate to entity-group permissions for reading objects in the at least one data set.

According to an aspect of the present disclosure, a non-transitory computer readable storage medium storing instructions for facilitating a permission management pipeline to provide policy taxonomy governance is disclosed. The storage medium including executable code which, when executed by a processor, may cause the processor to receive at least one data set that is shared from a producer application, the at least one data set may include data, corresponding metadata, and producer policy logic; tag the data and the corresponding metadata for each of the at least one data set to identify raw data and permission schema data; determine, by using at least one model, at least one rule by parsing the producer policy logic, the at least one rule may include a declarative rule; generate, by using the at least one model, at least one standard policy based on the determined at least one rule, the at least one standard policy may correspond to an executable standard entitlement policy; execute the generated at least one standard policy by using a policy enforcement function, the tagged data, and the tagged corresponding metadata; and generate, based on a result of the executing, at least one producer permission that is paired with the at least one data set, the at least one producer permission may include an entity-group access-control list of permissions that is associated with the at least one data set.

In accordance with an exemplary embodiment, when executed by the processor, the executable code may further cause the processor to derive an access permission for each of a plurality of data products from the producer application based on the generated at least one producer permission, wherein, when a query for access to the plurality of data products is received from a data consumer, the access may be limited to a subset of the plurality of data products for which an entity-group of the data consumer has obtained a permission.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
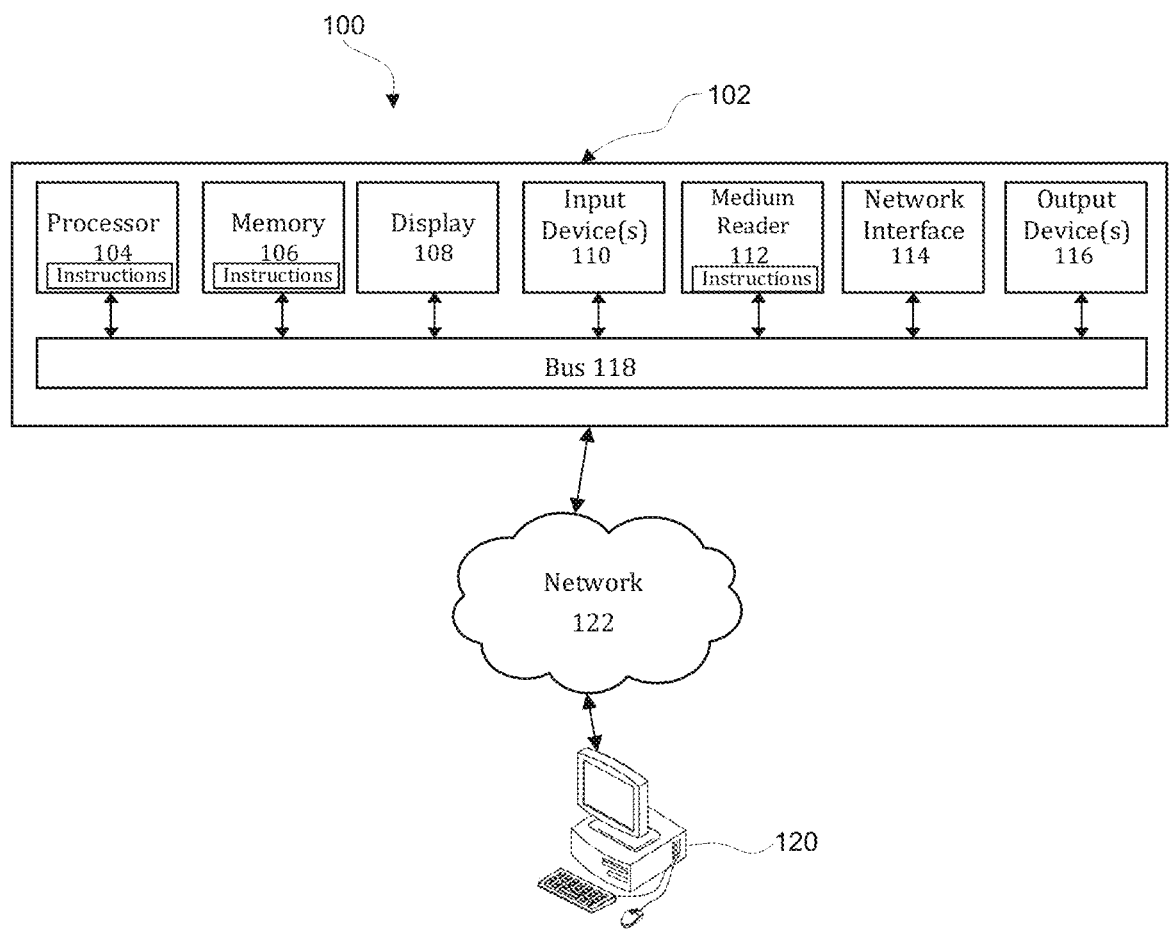
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, BLUETOOTH®, ZIG-BEE®, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating a permission management pipeline that transforms disparate permission policies from different computing platforms into a standardized and consistent policy taxonomy.

Figure 2:
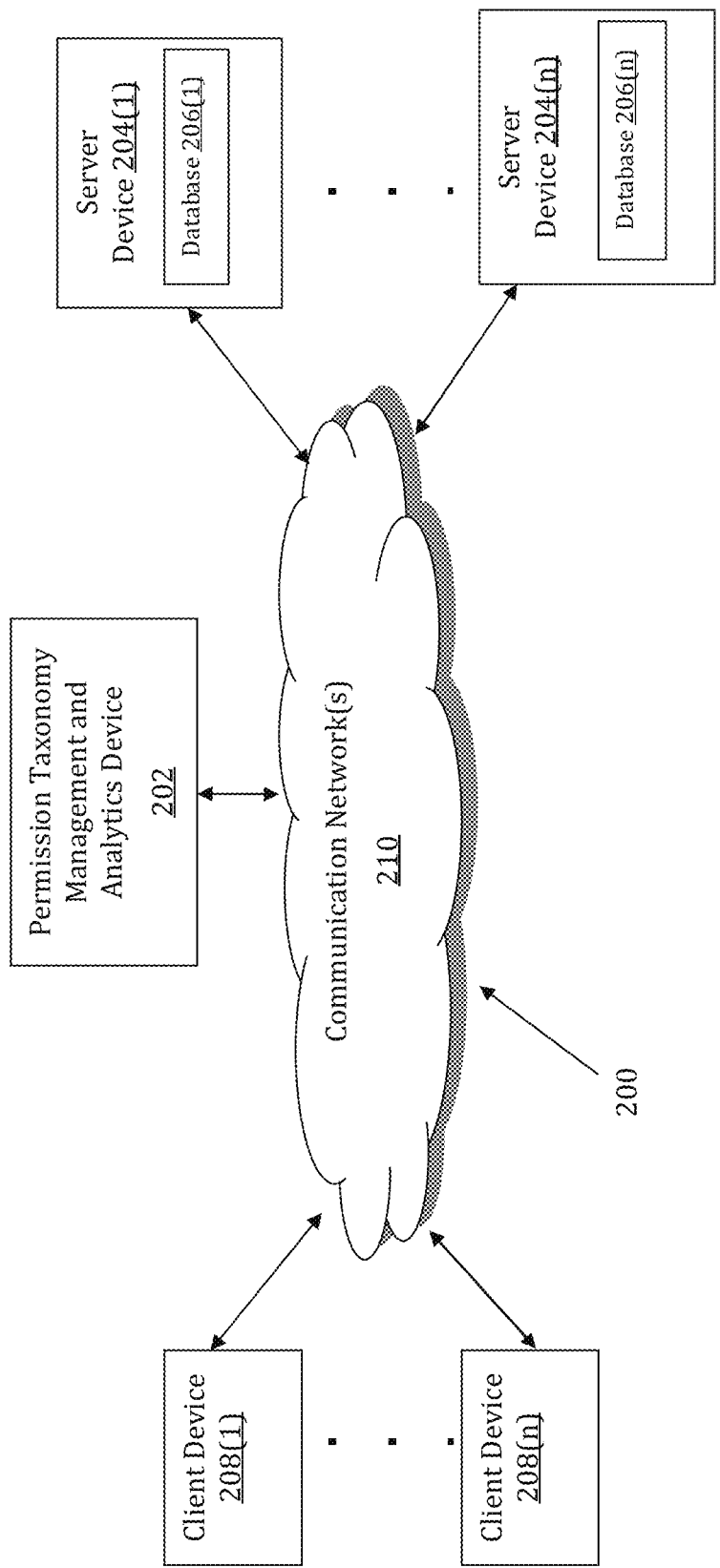
FIG. 2 illustrates an exemplary diagram of a network environment.

Referring to FIG. 2, a schematic of an exemplary network environment 200 for implementing a method for facilitating a permission management pipeline that transforms disparate permission policies from different computing platforms into a standardized and consistent policy taxonomy is illustrated. In an exemplary embodiment, the method is executable on any networked computer platform, such as, for example, a personal computer (PC).

The method for facilitating a permission management pipeline that transforms disparate permission policies from different computing platforms into a standardized and consistent policy taxonomy may be implemented by a Permission Taxonomy Management and Analytics (PTMA) device 202. The PTMA device 202 may be the same or similar to the computer system 102 as described with respect to FIG. 1. The PTMA device 202 may store one or more applications that can include executable instructions that, when executed by the PTMA device 202, cause the PTMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PTMA device 202 itself, may be located in virtual server(s) running in a cloud-based computing environment rather than being tied to one or more specific physical network computing devices. Also, the application(s) may be running in one or more virtual machines (VMs) executing on the PTMA device 202. Additionally, in one or more embodiments of this technology, virtual machine(s) running on the PTMA device 202 may be managed or supervised by a hypervisor.

In the network environment 200 of FIG. 2, the PTMA device 202 is coupled to a plurality of server devices 204(1)-204(n) that hosts a plurality of databases 206(1)-206(n), and also to a plurality of client devices 208(1)-208(n) via communication network(s) 210. A communication interface of the PTMA device 202, such as the network interface 114 of the computer system 102 of FIG. 1, operatively couples and communicates between the PTMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PTMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PTMA devices that efficiently implement a method for facilitating a permission management pipeline that transforms disparate permission policies from different computing platforms into a standardized and consistent policy taxonomy.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PTMA device 202 may be a standalone device or integrated with one or more other devices or apparatuses, such as one or more of the server devices 204(1)-204(n), for example. In one particular example, the PTMA device 202 may include or be hosted by one of the server devices 204(1)-204(n), and other arrangements are also possible. Moreover, one or more of the devices of the PTMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PTMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to data sets, data, metadata, producer policy logics, tags, raw data, permission schema data, models, declarative rules, standard policies, executable standard entitlement policies, policy enforcement functions, and producer permissions.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the PTMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PTMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the PTMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PTMA device 202, the server devices 204(1)-204(n), or the client devices 208(1)-208(n), for example, may be configured to operate as virtual instances on the same physical machine. In other words, one or more of the PTMA device 202, the server devices 204(1)-204(n), or the client devices 208(1)-208(n) may operate on the same physical device rather than as separate devices communicating through communication network(s) 210. Additionally, there may be more or fewer PTMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
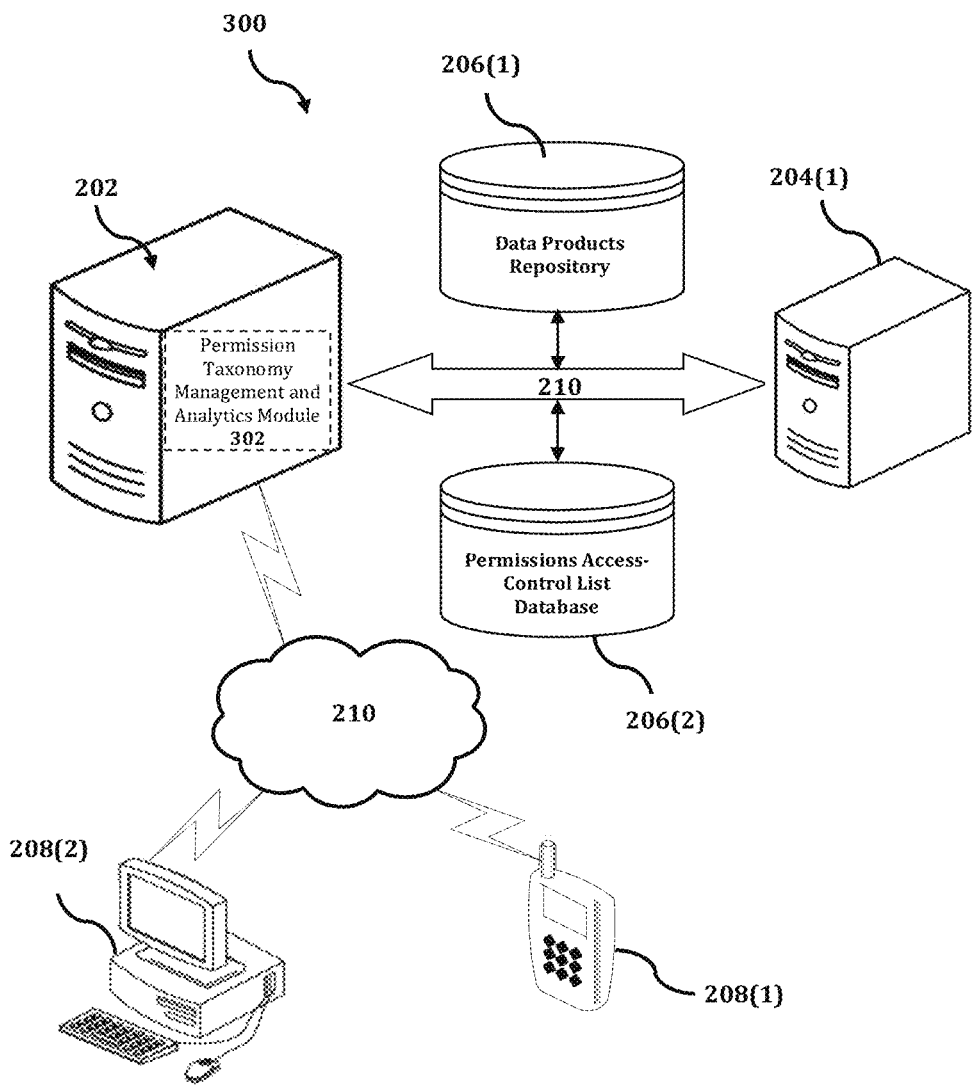
FIG. 3 shows an exemplary system for implementing a method for facilitating a permission management pipeline that transforms disparate permission policies from different computing platforms into a standardized and consistent policy taxonomy.

The PTMA device 202 is described and shown in FIG. 3 as including a permission taxonomy management and analytics module 302, although it may include other rules, policies, modules, databases, or applications, for example. As will be described below, the permission taxonomy management and analytics module 302 is configured to implement a method for facilitating a permission management pipeline that transforms disparate permission policies from different computing platforms into a standardized and consistent policy taxonomy.

An exemplary process 300 for implementing a mechanism for facilitating a permission management pipeline that transforms disparate permission policies from different computing platforms into a standardized and consistent policy taxonomy by utilizing the network environment of FIG. 2 is shown as being executed in FIG. 3. Specifically, a first client device 208(1) and a second client device 208(2) are illustrated as being in communication with PTMA device 202. In this regard, the first client device 208(1) and the second client device 208(2) may be "clients" of the PTMA device 202 and are described herein as such. Nevertheless, it is to be known and understood that the first client device 208(1) and/or the second client device 208(2) need not necessarily be "clients" of the PTMA device 202, or any entity described in association therewith herein. Any additional or alternative relationship may exist between either or both of the first client device 208(1) and the second client device 208(2) and the PTMA device 202, or no relationship may exist.

Further, PTMA device 202 is illustrated as being able to access a data products repository 206(1) and a permissions access-control list database 206(2). The permission taxonomy management and analytics module 302 may be configured to access these databases for implementing a method for facilitating a permission management pipeline that transforms disparate permission policies from different computing platforms into a standardized and consistent policy taxonomy.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PTMA device 202 via broadband or cellular communication. Of course, these embodiments are merely exemplary and are not limiting or exhaustive.

Upon being started, the permission taxonomy management and analytics module 302 executes a process for facilitating a permission management pipeline that transforms disparate permission policies from different computing platforms into a standardized and consistent policy taxonomy. An exemplary process for facilitating a permission management pipeline that transforms disparate permission policies from different computing platforms into a standardized and consistent policy taxonomy is generally indicated at flowchart 400 in FIG. 4.

Figure 4:
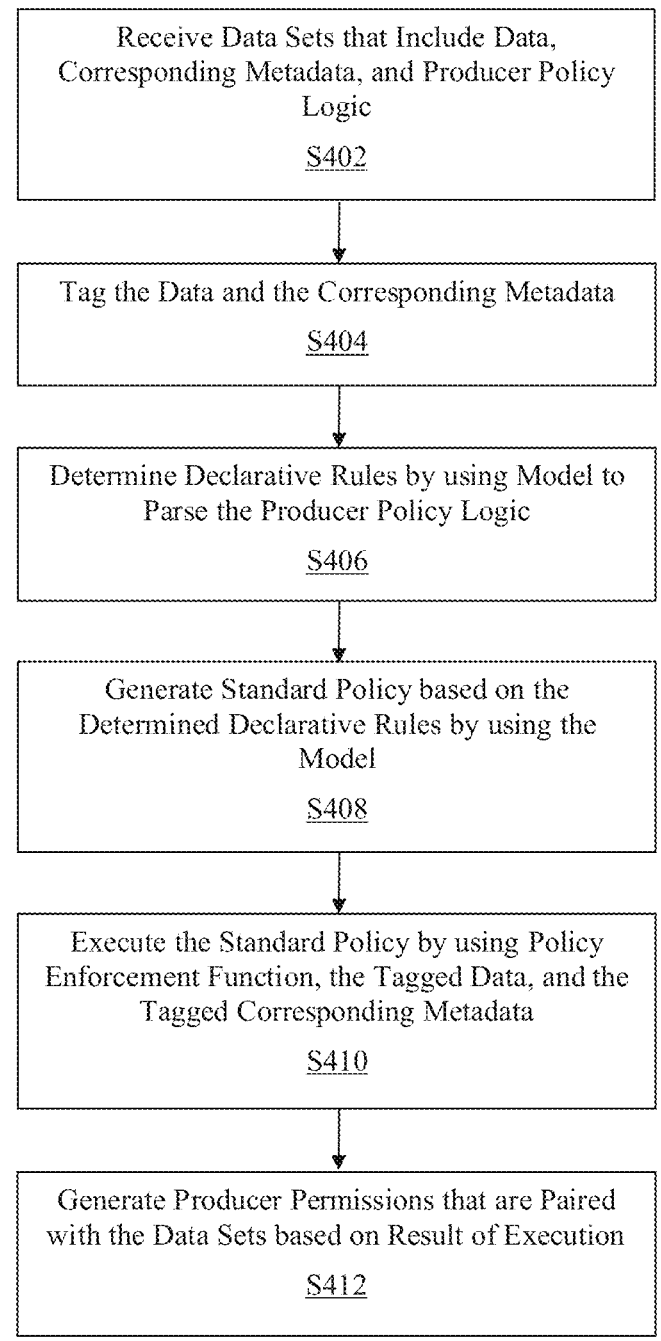
FIG. 4 is a flowchart of an exemplary process for implementing a method for facilitating a permission management pipeline that transforms disparate permission policies from different computing platforms into a standardized and consistent policy taxonomy.

In the process 400 of FIG. 4, at step S402, data sets that are shared from a producer application may be received. The data sets may include data, corresponding metadata, and producer policy logic. In an exemplary embodiment, the data sets may each relate to a collection of related sets of information that is composed of separate elements but may be manipulated as a unit by a computing device. The separate elements may relate to discrete items of related data that may be accessed individually, in combination, or managed as a whole entity. The data sets may relate to a collection of any data in any format such as, for example, a collection of tabular data in a plain text file format.

In another exemplary embodiment, the data may include any combination of numerical, alphabetical, and symbolic characters that together provide meaning and convey information. The data may be organized into structures such as, for example, tables that provide additional context and meaning. In another exemplary embodiment, the metadata may relate to a set of data that describes and gives information about other data. The metadata may provide a structured reference that helps to sort and identify attributes of the information it describes. The metadata may include at least one from among descriptive metadata, structural metadata, administrative metadata, reference metadata, statistical metadata, and legal metadata.

In another exemplary embodiment, the producer policy logic may relate to permission models that correspond to the producer applications. The permission models may include a collection of permissions for the producer applications such as, for example, access permissions for data generated by the producer applications. The permission models may also include entitlement policy rules that govern the permissions. For example, the entitlement policy rules may dictate that users with particular credentials are allowed to access data products of the producer applications for a certain amount of time.

In another exemplary embodiment, the data, corresponding metadata, and producer policy logic may be extracted from the producer applications. Alternatively, the data, corresponding metadata, and producer policy logic may be shared by the producer applications consistent with present disclosures. An interface such as, for example, an application programming interface (API) may be usable to facilitate transfers of the data and the metadata from the producer application to the claimed invention.

In another exemplary embodiment, the producer application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA® platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the data and the corresponding metadata may be tagged for each of the data sets. The data and the corresponding metadata may be tagged to identify raw data and permission schema data. In an exemplary embodiment, the data and corresponding metadata may be matched and mapped to normalized tags to facilitate standardized data processing. The data and corresponding metadata may be loaded into a conformed data format and normalized to maintain consistency. The conformed data format may be mapped to standard policy terms.

Consistent with present disclosures, an exemplary process for tagging the data and the corresponding metadata may include matching the data and the corresponding metadata with predetermined tags. The predetermined tags may correspond to normalized labels that identify the data and the corresponding metadata. The normalized labels may also provide context for the data and the corresponding metadata.

In another exemplary embodiment, the predetermined tags may include at least one from among a normalized descriptive policy tag, a raw producer entity-group permission tag, a raw producer data tag, and a conformed producer data tag. The predetermined tags may immunize various policies of the producer application from producer schema evolution. The predetermined tags may also normalize the various policies into standard policy terms. Finally, the predetermined tags may be mapped to the data and the corresponding metadata for each of the data sets.

In another exemplary embodiment, prior to the matching, the exemplary process for tagging the data and the corresponding metadata may include parsing the data and the corresponding metadata to identify data schemas. The data and the corresponding metadata may be parsed by using models such as, for example, machine learning models.

Then, predicted tags may be determined based on the identified data schemas. Consistent with present disclosures, the predicted tags may also be determined by using the models. For example, the identified data schemas may be usable as an input for a machine learning model that utilizes pattern recognition, historical tag data, and historical data schemas to determine the predicted tags that relates to the identified data schemas. Finally, the data and the corresponding metadata may be matched with the predicted tags. The data and the corresponding metadata may be matched with the predicted tags in a process similar to the matching process for the predetermined tags.

In another exemplary embodiment, the model may include at least one from among a machine learning model, a mathematical model, a process model, and a data model. The model may relate to machine learning algorithms such as, for example, decision tree algorithms, ensemble trees algorithms, neural network architectures algorithms, and linear regression algorithms. Using various machine learning algorithms may result in various corresponding model architectures. For example, a tree-based machine learning model architecture may be computed by using a decision tree algorithm.

In another exemplary embodiment, the model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S406, rules may be determined by parsing the producer policy logic. The rules may be determined by using models such as, for example, machine learning models. In an exemplary embodiment, the rules may relate to instructions that define allowable actions and/or unallowable actions. For example, rules associated with a data product may govern how the data product may be accessed and in what way. In another exemplary embodiment, the rules may include declarative rules. The declarative rules may denote high-level programming languages which are usable without requiring a programmer to specify an exact procedure to be followed. The declarative rules may describe desired results without explicitly listing commands and/or steps that must be performed.

In another exemplary embodiment, the producer policy logic may relate to permission models that correspond to the producer applications. The permission models may include a collection of permissions for the producer applications such as, for example, access permissions for data generated by the producer applications. The models may be usable to parse the permission models to determine the rules.

In another exemplary embodiment, the models may be usable to parse the coded permission models into component elements. The models may then use the component elements to automatically generate the declarative rules. In another exemplary embodiment, the models may use pattern recognition and historical rules data to automatically validate the generated declarative rules. The generated declarative rules may be validated to ensure that toxic combinations of permissions, which may result in unexpected system operations, are not present. In another exemplary embodiment, the models may use pattern recognition and historical rules data to determine whether anomalous entitlements are present in the generated declarative rules. The anomalous entitlements may relate to unexpected entitlements that may indicate a potential error condition such as, for example, a coding error.

At step S408, standard policies may be generated based on the determined rules. The standard policies may be generated by using models such as, for example, machine learning models. In an exemplary embodiment, the standard policies may correspond to an executable standard entitlement policy. The models may be usable to compose and/or compile the rules into the standard entitlement policy that is executable by a computing device. In another exemplary embodiment, the standard policies may relate to generic policies that are usable to define the permissions in various computing environments. The generic policies, with minimal transformation, may be loaded into multiple computing environments to enforce data access controls.

Consistent with present disclosures, an exemplary process for generating the standard policies may include automatically generating the standard policies based on the determined rules. The standard policies may be automatically generated by using the models without additional user intervention. Then, the standard policies may be validated based on a predetermined guideline. The standard policies may be validated by using the models. The standard policies may be validated to ensure compliance with the predetermined guideline.

In another exemplary embodiment, the predetermined guideline may include at least one from among a business guideline, an operational guideline, and a regulatory guideline. The business guideline may correspond to a governing principle such as, for example, a minimal storage cost governing principle that is established by business administrators of an entity to facilitate day-to-day business activities. The operational guideline may correspond to a governing principle such as, for example, a data storage reliability governing principle that is established by system administrators of the entity to facilitate system functionalities. The regulatory guideline may correspond to a governing principle such as, for example, a storage of customer financial data governing principle that is established by regulatory agencies to facilitate industry standards.

At step S410, the generated standard policies may be executed by using a policy enforcement function, the tagged data, and the tagged corresponding metadata. In an exemplary embodiment, the policy enforcement function may be executed to generate normalized entity-group permission access-control lists (ACLs). The entity-group permission ACLs may be usable alongside the shared data sets from the producer application.

In another exemplary embodiment, the policy enforcement function may include a lambda function. The lambda function may correspond to an anonymous function that relates to a function definition which is not bound to an identifier. The lambda function may include arguments that are passed to higher-order functions and/or used for constructing a result of a higher-order function that needs to return a function. The lambda function may take any number of arguments but can only have one expression.

In another exemplary embodiment, the lambda function may relate to a computing service in a cloud platform that enables code to be run without provisioning and/or managing servers. The computing service may execute code on a high-availability compute infrastructure and performs all the administration of the compute resources such as, for example, server and operating system maintenance, capacity provisioning and automatic scaling, as well as logging.

At step S412, producer permissions that are paired with the data sets may be generated based on a result of the executing. In an exemplary embodiment, the producer permissions may include entity-group access-control lists (ACLs) of permissions that are associated with the data sets. The generated producer permissions may relate to entity-group permissions for reading objects in the data sets.

In another exemplary embodiment, access permissions for each of a plurality of data products from the producer application may be derived. The access permissions may be derived based on the generated producer permissions. In another exemplary embodiment, a data consumer may only access the data products that an entity-group of the data consumer is permissioned for. The data consumer may request access to the data products from the producer application via a query. For example, when a query for access to the data products is received from the data consumer, the access may be limited to a subset of the data products for which an entity-group of the data consumer has obtained permission.

Consistent with present disclosures, an exemplary process for the data consumer to request access to the data products may include receiving an access query from the data consumer. The access query for the plurality of data products from the producer application may be received via an interface such as, for example, and application programming interface. The access query may include an identifier such as, for example, a security identifier (SID) that corresponds to the data consumer. The identifier may correspond to a unique and immutable identifier that is associated with the data consumer. For example, the identifier may include a series of alphanumeric characters and symbols that are usable to identify and differentiate the data consumer.

Then, the exemplary process for requesting access to the data products may include verifying the access query by using the identifier. In another exemplary embodiment, verification of the access query may include identifying consumer access permissions that are associated with the data consumer by using the identifier. For example, the identifier may be usable to look up user groups and intersect on entities in entity-group permissions.

Next, the identified consumer access permissions may be compared with the access permissions that correspond to each of the data products. The access query may be verified based on a result of the comparing. For example, the access query may be verified when the identified consumer access permissions match the access permissions, i.e., access requirements of the data products. Conversely, the access query may not be verified when the identified consumer access permissions do not match the access permissions of the data products. Consistent with present disclosures, the access query may be verified based on predetermined criteria such as, for example, any matching combinations of consumer access permissions and data products access permissions.

Finally, the exemplary process for requesting access to the data products may include exposing the plurality of data products to the data consumer based on a result of the verifying. The data products may be exposed to the data consumer in response to the access query when the access query is verified. Consistent with present disclosures, the data products may be accessible to the data consumer when the access query is verified. In an exemplary embodiment, exposure of the data products may be governed by any combination of consumer access permissions associated with the data consumer and access permissions associated with the data products. For example, access limitations such as an access time period that is associated with the consumer access permission may govern how long the data products may be accessible by the data consumer.

Figure 5:
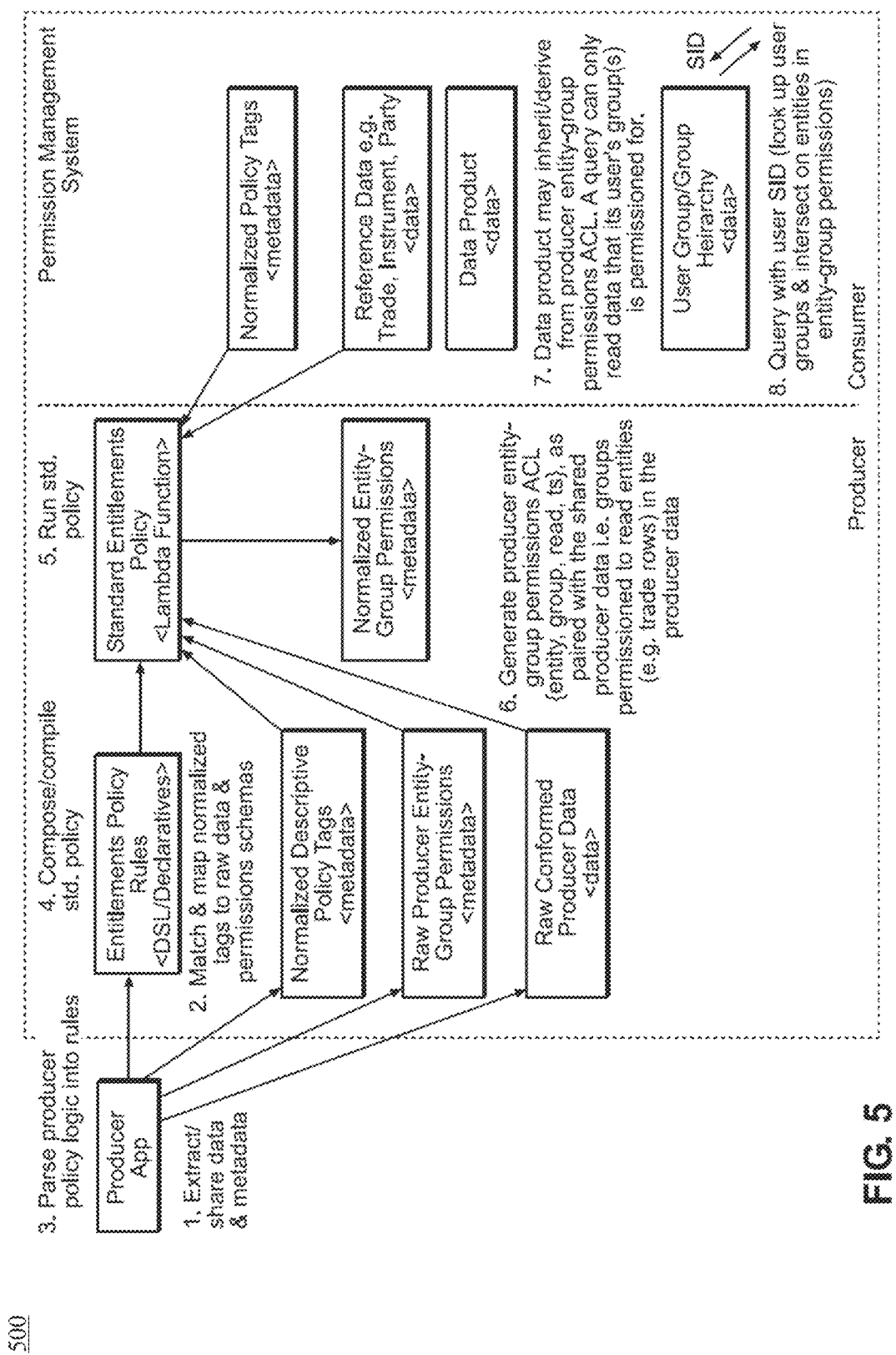
FIG. 5 is a flow diagram of an exemplary process for implementing a method for facilitating a permission management pipeline that transforms disparate permission policies from different computing platforms into a standardized and consistent policy taxonomy.

FIG. 5 is a flow diagram 500 of an exemplary process for implementing a method for facilitating a permission management pipeline that transforms disparate permission policies from different computing platforms into a standardized and consistent policy taxonomy. In FIG. 5, a series of processes may be established to load permissions into a conformed data format on public cloud storage. The series of processes may include a job that, when executed, may normalize and map the permissions to generic policies. The generic policies may then, with minimal transformation, be loaded into multiple computing environments to enforce cloud data access control.

As illustrated in FIG. 5, the claimed invention may be represented as a "MDL" computing environment that includes producer applications and consumer applications. At step 1, data and corresponding metadata may be extracted from and/or shared by the producer application. At step 2, the data and corresponding metadata may be matched and mapped with normalized tags to identify raw data components and permission schema components. The tags may immunize policy from producer schema evolution. The tags may also normalize the data and corresponding metadata into standard policy terms. Consistent with present disclosures, machine learning models may be usable to infer tags from and match tags to schema.

At step 3, producer policy logic from the producer application may be parsed into rules. Consistent with present disclosures, machine learning models may be usable to parse code into declarative rules. At step 4, the rules may be composed and/or compiled into standard policies. Consistent with present disclosures, machine learning models may be usable to compose rules into a runnable standard policy, i.e., policy auto generation plus validation.

At step 5, the standard policies may be executed in a computing environment to establish a standard entitlements policy. Policy enforcement functions may be executed to generate normalized entity-group permission ACLS, alongside shared producer data. At step 6, producer entity-group permission ACLs may be generated as paired with the shared data from the producer application. For example, the groups may be permissioned to read entities in the data from the producer application.

At step 7, data products may inherit and/or derive permissions from the producer entity-group permissions ACL. A query by a data consumer may only read data that its user groups are permissioned for. At step 8, the data consumer may initiate a query with an identifier that is associated with the data consumer. The identifier may be usable to look up user groups and intersect on entities in the entity-group permissions.

Figure 6:
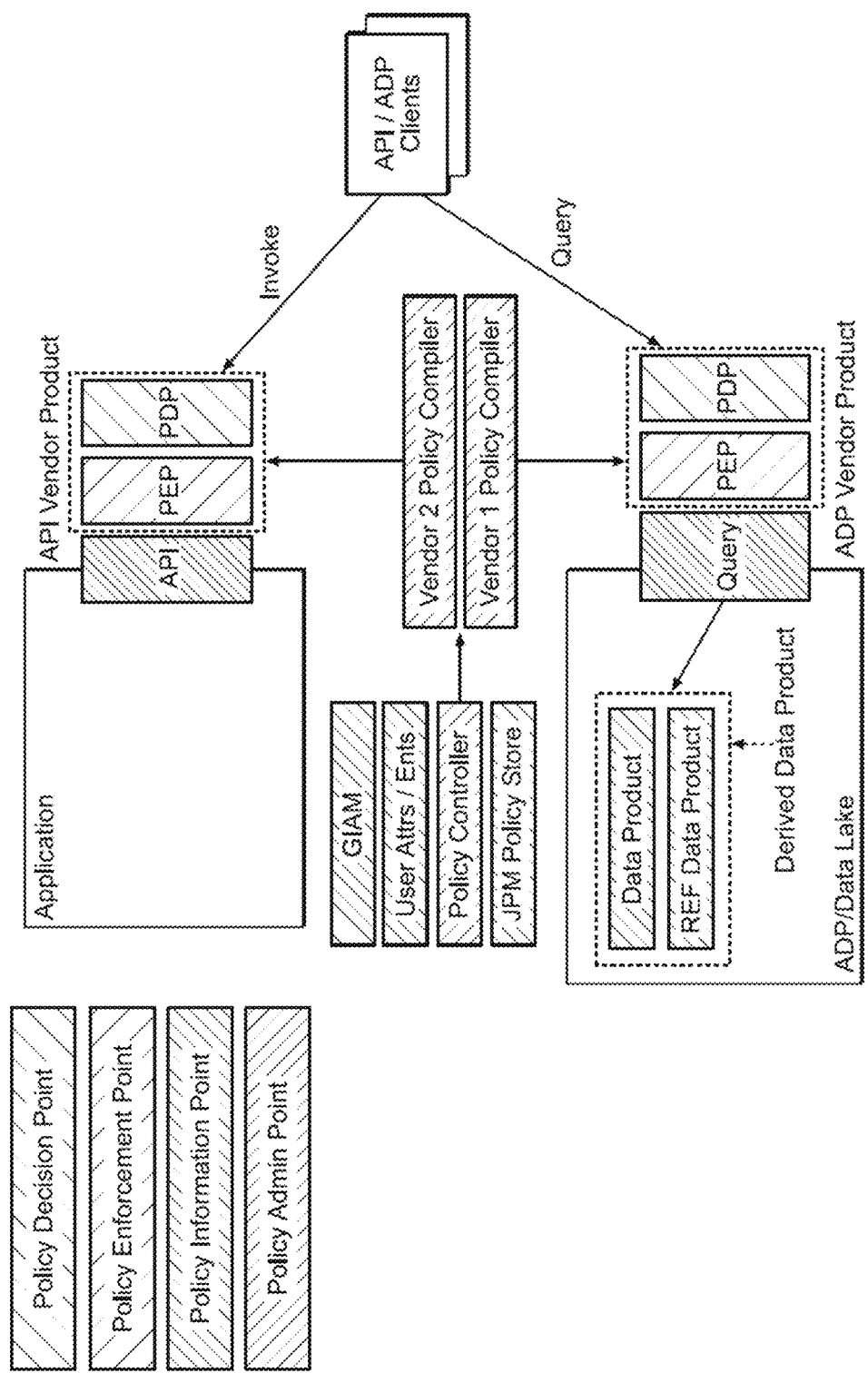
FIG. 6 is a logical view of an entitlement architecture of an exemplary process for implementing a method for facilitating a permission management pipeline that transforms disparate permission policies from different computing platforms into a standardized and consistent policy taxonomy.

FIG. 6 is a logical view 600 of an entitlement architecture of an exemplary process for implementing a method for facilitating a permission management pipeline that transforms disparate permission policies from different computing platforms into a standardized and consistent policy taxonomy. In FIG. 6, policy controllers may govern permissions for producer applications and data products in storage consistent with present disclosures. Clients may invoke the applications and/or query the storage component for the data products according to the governing permissions.

Accordingly, with this technology, an optimized process for facilitating a permission management pipeline that transforms disparate permission policies from different computing platforms into a standardized and consistent policy taxonomy is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating a permission management pipeline to provide policy taxonomy governance, the method being implemented by at least one processor, the method comprising:

receiving at least one data set that is shared from a producer application, the at least one data set including data, corresponding metadata, and producer policy logic;

training a machine learning (ML) model based on a cross-validation technique, a holdout technique, and a bootstrap technique, the ML model being trained in pattern detection correlating with a policy taxonomy governance associated with different computing platforms and the ML model being trained in operating with a least squares error rate within a predetermined range;

tagging the data and the corresponding metadata for each of the at least one data set to identify raw data and permission schema data for input into the trained ML model;

determining, by the trained ML model, at least one rule by parsing the producer policy logic, the at least one rule including a declarative rule;

generating, by the trained ML model, at least one standard policy based on the determined at least one rule, the at least one standard policy corresponding to an executable standard entitlement policy;
executing the generated at least one standard policy by using a policy enforcement function, the tagged data, and the tagged corresponding metadata; and
generating based on a result of the executing, at least one producer permission that is paired with the at least one data set, the at least one producer permission including an entity-group access-control list of permissions that is associated with the at least one data set.

2. The method of claim 1, further comprising:
deriving an access permission for each of a plurality of data products from the producer application based on the generated at least one producer permission,
wherein, when a query for access to the plurality of data products is received from a data consumer, the access is limited to a subset of the plurality of data products for which an entity-group of the data consumer has obtained a permission.

3. The method of claim 2, further comprising:
receiving, from the data consumer, an access query for the plurality of data products, the access query including a security identifier that corresponds to the data consumer;
verifying the access query by using the security identifier; and
exposing the plurality of data products to the data consumer based on a result of the verifying.

4. The method of claim 3, wherein verifying the access query further comprises:
identifying at least one consumer access permission that is associated with the data consumer by using the security identifier;
comparing the identified at least one consumer access permission with the access permission that corresponds to each of the plurality of data products; and
verifying the access query based on a result of the comparing.

5. The method of claim 1, wherein tagging the data and the corresponding metadata further comprises:
matching the data and the corresponding metadata with a predetermined tag, the predetermined tag corresponding to a normalized label that identifies the data and the corresponding metadata, and provides context for the data and the corresponding metadata; and
mapping the predetermined tag to the data and the corresponding metadata for each of the at least one data set.

6. The method of claim 5, wherein the predetermined tag includes at least one from among a normalized descriptive policy tag, a raw producer entity-group permission tag, a raw producer data tag, and a conformed producer data tag.

7. The method of claim 5, wherein prior to the matching, the method further comprises:
parsing, by the trained ML model, the data and the corresponding metadata to identify at least one data schema;
determining, by trained ML model, a predicted tag based on the identified at least one data schema; and
matching the data and the corresponding metadata with the predicted tag.

8. The method of claim 1, wherein generating the at least one standard policy further comprises:
automatically generating, by the trained ML model, the at least one standard policy based on the determined at least one rule; and
validating, by the trained ML model, the at least one standard policy based on a predetermined guideline.

9. The method of claim 1, wherein the generated at least one producer permission relates to entity-group permissions for reading objects in the at least one data set.

10. A computing device configured to implement an execution of a method for facilitating a permission management pipeline to provide policy taxonomy governance, the computing device comprising:
a processor;
a memory; and
a communication interface coupled to each of the processor and the memory,
wherein the processor is configured to:
receive at least one data set that is shared from a producer application, the at least one data set including data, corresponding metadata, and producer policy logic;
train a machine learning (ML) model based on a cross-validation technique, a holdout technique, and a bootstrap technique, the ML model being trained in pattern detection correlating with a policy taxonomy governance associated with different computing platforms and the ML model being trained in operating with a least squares error rate within a predetermined range;
tag the data and the corresponding metadata for each of the at least one data set to identify raw data and permission schema data for input into the trained ML model;
determine, by the trained ML model, at least one rule by parsing the producer policy logic, the at least one rule including a declarative rule;
generate, by the trained ML model, at least one standard policy based on the determined at least one rule, the at least one standard policy corresponding to an executable standard entitlement policy;
execute the generated at least one standard policy by using a policy enforcement function, the tagged data, and the tagged corresponding metadata; and
generate, based on a result of the executing, at least one producer permission that is paired with the at least one data set, the at least one producer permission including an entity-group access-control list of permissions that is associated with the at least one data set.

11. The computing device of claim 10, wherein the processor is further configured to:
derive an access permission for each of a plurality of data products from the producer application based on the generated at least one producer permission,
wherein, when a query for access to the plurality of data products is received from a data consumer, the access is limited to a subset of the plurality of data products for which an entity-group of the data consumer has obtained a permission.

12. The computing device of claim 11, wherein the processor is further configured to:
receive, from the data consumer, an access query for the plurality of data products, the access query including a security identifier that corresponds to the data consumer;
verify the access query by using the security identifier; and
expose the plurality of data products to the data consumer based on a result of the verifying.

13. The computing device of claim 12, wherein, to verify the access query, the processor is further configured to:
identify at least one consumer access permission that is associated with the data consumer by using the security identifier;
compare the identified at least one consumer access permission with the access permission that corresponds to each of the plurality of data products; and
verify the access query based on a result of the comparing.

14. The computing device of claim 10, wherein, to tag the data and the corresponding metadata, the processor is further configured to:
match the data and the corresponding metadata with a predetermined tag, the predetermined tag corresponding to a normalized label that identifies the data and the corresponding metadata, and provides context for the data and the corresponding metadata; and
map the predetermined tag to the data and the corresponding metadata for each of the at least one data set.

15. The computing device of claim 14, wherein the predetermined tag includes at least one from among a normalized descriptive policy tag, a raw producer entity-group permission tag, a raw producer data tag, and a conformed producer data tag.

16. The computing device of claim 14, wherein, prior to the matching, the processor is further configured to:
parse, by the trained ML model, the data and the corresponding metadata to identify at least one data schema;
determine, by the trained ML model, a predicted tag based on the identified at least one data schema; and
match the data and the corresponding metadata with the predicted tag.

17. The computing device of claim 10, wherein, to generate the at least one standard policy, the processor is further configured to:
automatically generate, by the trained ML model, the at least one standard policy based on the determined at least one rule; and
validate, by the trained ML model, the at least one standard policy based on a predetermined guideline.

18. The computing device of claim 10, wherein the generated at least one producer permission relates to entity-group permissions for reading objects in the at least one data set.

19. A non-transitory computer readable storage medium storing instructions for facilitating a permission management pipeline to provide policy taxonomy governance, the storage medium comprising executable code which, when executed by a processor, causes the processor to:
receive at least one data set that is shared from a producer application, the at least one data set including data, corresponding metadata, and producer policy logic;
train a machine learning (ML) model based on a cross-validation technique, a holdout technique, and a bootstrap technique, the ML model being trained in pattern detection correlating with a policy taxonomy governance associated with different computing platforms and the ML model being trained in operating with a least squares error rate within a predetermined range;
tag the data and the corresponding metadata for each of the at least one data set to identify raw data and permission schema data for input into the trained ML model;
determine, by the trained ML model, at least one rule by parsing the producer policy logic, the at least one rule including a declarative rule;
generate, by the trained ML model, at least one standard policy based on the determined at least one rule, the at least one standard policy corresponding to an executable standard entitlement policy;
execute the generated at least one standard policy by using a policy enforcement function, the tagged data, and the tagged corresponding metadata; and
generate, based on a result of the executing, at least one producer permission that is paired with the at least one data set, the at least one producer permission including an entity-group access-control list of permissions that is associated with the at least one data set.

20. The storage medium of claim 19, wherein, when executed by the processor, the executable code further causes the processor to:
derive an access permission for each of a plurality of data products from the producer application based on the generated at least one producer permission,
wherein, when a query for access to the plurality of data products is received from a data consumer, the access is limited to a subset of the plurality of data products for which an entity-group of the data consumer has obtained a permission.

* * * * *